United States Patent [19]

Gemmellaro et al.

[11] 4,030,759
[45] June 21, 1977

[54] PNEUMATIC ANTI-SKID BRAKE SYSTEM HAVING PROPORTIONAL PRESSURE CONTROL MEANS

[75] Inventors: Carmelo Gemmellaro, Turin; Virginio Maggioni, Rosta (Turin); Renzo Moretti, Cambiano (Turin), all of Italy

[73] Assignee: Fiat Societa per Azioni, Turin, Italy

[22] Filed: May 22, 1975

[21] Appl. No.: 580,006

[30] Foreign Application Priority Data

May 30, 1974 Italy .................................. 68689/74

[52] U.S. Cl. .................................. 303/119; 303/68
[51] Int. Cl.² .......................................... B60T 8/02
[58] Field of Search ................. 303/21 F, 61–63, 303/68–69, 113, 114, 115, 116, 117, 118, 119; 188/181 A

[56] References Cited

UNITED STATES PATENTS

| 3,731,980 | 5/1973 | Fink et al. | 303/21 F |
| 3,753,599 | 8/1973 | Michellone et al. | 303/21 F |
| 3,767,271 | 10/1973 | Grosseau | 303/21 F |
| 3,802,748 | 4/1974 | Michellone | 303/21 F |
| 3,820,856 | 6/1974 | Adahan | 303/21 F |
| 3,826,542 | 7/1974 | Peruglia | 303/21 F |
| 3,866,983 | 2/1975 | Kondo | 303/21 F |

Primary Examiner—Trygve M. Blix
Assistant Examiner—Douglas C. Butler
Attorney, Agent, or Firm—Sughrue, Rothwell, Mion, Zinn & Macpeak

[57] ABSTRACT

An improvement in pneumatic anti-skid braking systems for at least one wheel of a vehicle, of the type having a first valve system for causing a controlled reduction in braking pressure in a brake actuator upon reception of a control signal from an anti-skid control device sensitive to the dynamic state of at least one wheel of the vehicle, and a second valve system for causing a subsequent controlled rise in pressure after the signal from the anti-skid control device has been removed, the improvement being the provision of an accumulator in parallel with the first valve system and having two unidirectional valves, one at each side, which permit the accumulator to charge up to the braking pressure during normal braking, store this pressure upon anti-skid release of the braking pressure, and then deliver its charge to the circuit, causing a rapid increase of braking pressure after the anti-skid control signal is removed from the first valve system.

2 Claims, 2 Drawing Figures

PNEUMATIC ANTI-SKID BRAKE SYSTEM HAVING PROPORTIONAL PRESSURE CONTROL MEANS

The present invention relates to a pneumatic anti-skid brake system. There are many types of pneumatic brake systems with anti-skid devices known in the art; the present invention constitutes an improvement to a particular type of anti-skid system which is described in Italian Pat. No. 942,915, which describes in detail an installation of the type comprising a pressure source of compressed air, a brake actuator for at least one vehicle wheel, means for connecting the pressure source to the brakes, including valve means operable to cause the required pressure variations in the case of braking accompanied by skidding or incipient skidding of the wheels, to provide the shortest braking distance in the circumstances and to eliminate other inconveniences such as side-skidding, sudden jolts, etc., which would in themselves cause a decrease in the road-holding of the vehicle. The above mentioned valve systems include a discharge valve unit, which by means of suitable calibrated openings discharge the air from the brakes in the required manner, under the control of an electro-valve which is in turn actuated by a central electronic unit sensitive to the dynamic state of the wheel. Upstream of the discharge valve system and the electro-valve a second valve system is provided to control a differential increase of the pressure, this has the effect of causing a gradual increase of the braking pressure when the brakes are applied in the brake application and release cycles following the first operation of the anti-skid device.

The object of the present invention is to allow, initially the braking pressure in the braking cycles which follow the first operation of the anti-skid device, to increase rapidly and preferably in a manner proportional to the immediately preceding decrease in pressure; in fact, it has been found by experimental tests that the influence of this proportionality is decisive in obtaining good braking either on surfaces with a low coefficient of friction or on surfaces with a high coefficient of friction. Moreover, again on the basis of experimental results, it has been found that this characteristics is important in order to prevent sudden jolts and possible loss of vehicle control at either low or high speeds. When the dynamic state of the wheel is such that it is no longer in an incipient skidding situation the braking pressure again increases, due to the delivery valve unit, back to the full pressure applied by the pedal.

According to the present invention, there is provided a pneumatic anti-skid brake system of the type comprising a pressure source of compressed air, a brake actuator for at least one wheel of the vehicle, control means for connecting the pressure source to the brake actuator to cause braking of the wheel, an anti-skid control device sensitive to the dynamic state of the wheel and operable to provide a control signal when incipient skidding is sensed, a first valve system for controlling the release of braking pressure when a signal is received from the anti-skid control device, and a second valve system operable to control the subsequent increase in the braking pressure after the signal from the anti-skid control device is removed, characterised in that there is further provided an accummulator which is connected in parallel with the said first valve system and in series with two unidirectional valves one of which prevents the flow of air under pressure from the second valve system to the accummulator and the other of which prevents the flow of air from the accummulator to the brake actuator, the two unidirectional valves permitting discharge of the accummulator to the brake actuator via the first valve system immediately after removal of the anti-skid control signal from the anti-skid control device.

One embodiment of the invention will now be more particularly described, by way of example, with reference to the accompanying drawings, in which.

Figure 1:
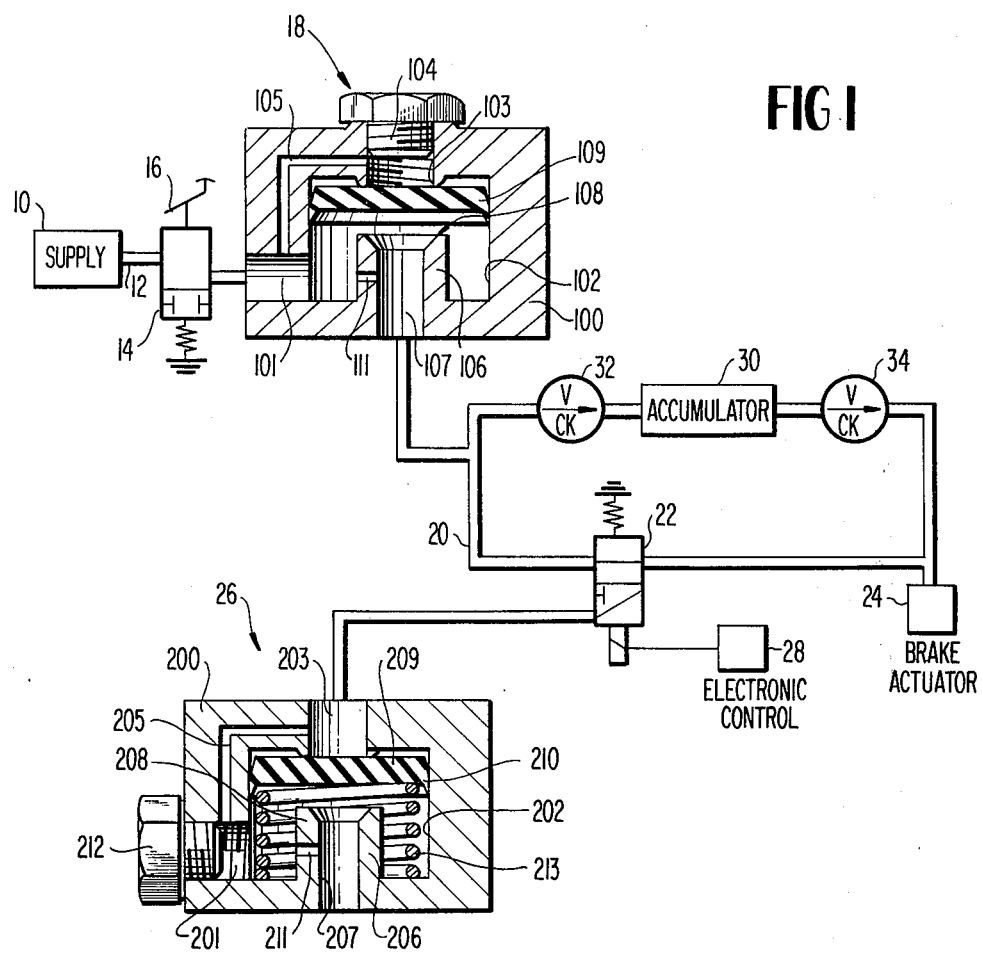
FIG. 1 is a schematic block diagram illustrating the embodiment.

With reference to the drawings, there is shown a pneumatic fluid pressure source, for example a compressor, which delivers compressed air to a pipe 12; a modulating valve 14, of conventional type, actuated by the brake pedal 16 of the vehicle, adjusts the pressure in the braking circuit in dependence on the pressure exerted on the brake pedal 16. Downstream from the valve 14 there is a valve unit 18 which causes a differentiation of the increase in braking pressure during the successive interventions of the anti-skid device, as will be described in greater detail below. The valve unit 18 comprises a body 100 having formed therein a distribution chamber 102 communicating with an inlet passage 101 and with a further passage 103 closed in this case by means of a threaded plug 104. The passages 101 and 103 are connected therebetween by a restricted passage 105 formed inside of the body 100. Into the chamber 102 projects upwardly an extension 106 having an inner outlet passage 107 and being formed at its top with a valve seat 108. A valve member having the form of a rubber disc 109 provided with a yieldable annular lip is slidable in the chamber 10 between a position in which it is near to the passage 103 and a position in which it bears upon the seat 108 and closes the passage 107. A restricted opening 111 bored in the wall of the extension 106 connects further the chamber 102 with the passage 107 communicating with the supply pipe 20. The delivery outlet of the valve 18 is connected to a supply pipe 20 which leads to a three-way, two-position, electro-valve 22, connected to the brake actuator 24 of a wheel of the vehicle, or to repeater valves or the like in a known way for use on trailers.

In its normal position the electro-valve 22 permits free communication between the source of compressed air and the brake actuator whilst in the switched position it blocks the source of pressure and connects the brake actuator 24 to a metering discharge device 26 having a body confining a distribution chamber 202 communicating through an inlet opening 203 with the electro-valve 22 and with the atmosphere through an outlet passage 207 extending through a projection 206 opposite the inlet passage 203. At the top of the projection 206 is formed a valve seat 208 cooperating with a valve member 209 having the form of a rubber disc provided with a peripheral flexible diverging lip 210. A restricted passage 205 connects the inlet passage 203 to a passage 201 communicating with the chamber 202 and closed from the outward by means of a plug 212. A restricted passage 211 bored in the wall of the projection 206 connects the chamber 202 with the outlet passage 207, and a helical spring 213 maintains the valve member 209 in its normal position shown in FIG.

1, near, the inlet passage 203 and leaves free the communication between the chamber 202 and the outlet passage 207.

The valve unit 18 and the metering device 26 operate as follows:

Upon actuating the pedal 16 air under pressure is admitted into the passage 101 of the metering valve 18. The air displaces upwardly the valve member 109 and flows directly towards the outlet passage 107, the pipe 20 and the electro-valve 22 and towards the brake actuator 24 so as to produce the actuation of the brake. Assuming now that the braking is so sharp as to cause in a known manner the operation of the anti-skid control device and a commutation of the electro-valve 22, the air under pressure will be discharged from the brake actuator 24 into the inlet passage 203 of the metering device 26. If the pressure which arrives to the passage 203 is not great enough to generate a thrust capable to displace the valve member 209 against the action of the spring 213, said member 209 remains stationary and spaced from the valve seat 208, as shown in the drawings. The air under pressure arriving to the passage 203 bypasses the valve member 209 through the passage 205 and also deflects the flexible lip 210 and reaches the atmosphere through the outlet passage 207.

If the pressure of the air arriving to the passage 203 is great enough to overcome the action of the spring 213, the valve member 209 is shifted downwardly and engages the seat 208, closing it. The air under pressure flows in this case through passage 205, past the deflected lip 210 of the member 209, through the restricted passage 211 and will thus be gradually discharged into the atmosphere through the outlet passage 207. The valve member 209 returns towards the position shown in the drawings, when the pressure drops to a valve lower than the necessary to overcome the action of the spring 213. The commutation of the electro-valve 22 at the end of the wheel lock condition causes simultaneously a pressure drop in the pipe 20 and hence in the chamber 102. In this case the pressure in the passage 103 actually corresponding to the pressure applied to the passage 101 of the valve 100 displaces the valve member which reaches the seat 108 and closes the latter. The pressure stored in the accumulator 30 will then pass through valve 32 into pipe 20 to initiate the increase in pressure in actuator 24. Subsequently, the air under pressure from supply 10 reaches the passage 107 and the pipe 20 through the restricted opening 111 and therefore gradually increases the pressure further in actuator 24. Such a gradual pressure rise in the brake actuator will be repeated during all working cycles of the anit-skid control device 24, until such process will be interrupted by releasing the pedal 16.

The switching of the electro-valve 22 is controlled by an electronic unit 28 which is sensitive to the dynamic state of at least on wheel of the vehicle and which operates to transmit a switching signal in the event of incipient skidding of the wheel being detected. Across the electro-valve 22 there is arranged in parallel an accumulator 30 which has two unidirectional valves 32, 34 which prevent the passage of air from the valve unit 18 to the accumulator 30, but allow it in the other direction, and which likewise prevent the passage of air from the accumulator 30 to the brake actuator 24.

Figure 2:
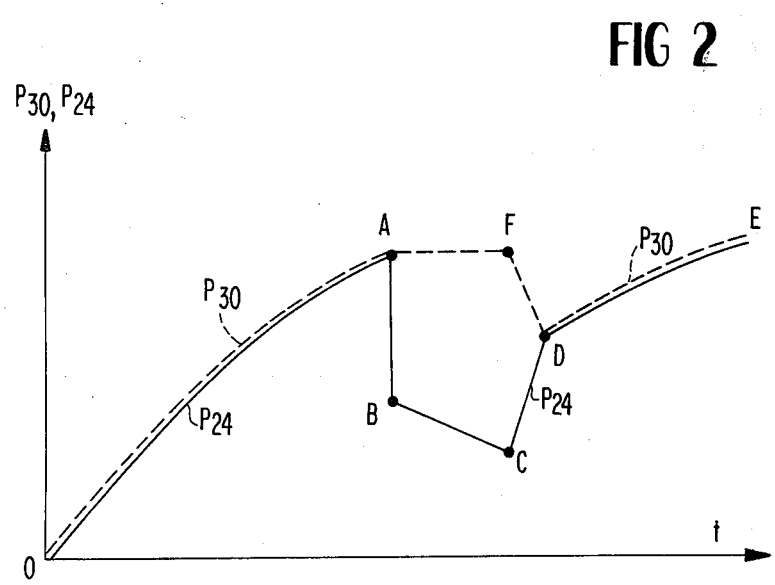
FIG. 2 is an explanatory diagram illustrating the operation of the embodiment shown diagrammatically in FIG. 1.

The operation of the system is shown in FIG. 2, in which the x-axis represents the time $t$, and the y-axis represents the braking pressure, indicated P24, and the pressure in the acccumulator 30 shown by a dotted line, and indicated P30. The initial rise from O to A represents the progressive increase in pressure within the system during braking, both the pressure P24 and the pressure P30 rising together. When, at point A, the control device 28 transmits a switching signal to the electro-valve 22, this commutes to the switched position and the pressure at the brake actuator 24 first decreases sharply, as shown by the line AB and then more gradually as indicated by the line BC, under the discharge control effect of the metering outlet 26. During this time the pressure in the accumulator 30 remains constant as shown by the line AF. Thus, effectively, the pressure in the braking system prior to operation of the anti-skid system remains memorized in the accumulator 30, by the effect of the unidirectional valves 32, 34. Point C represents the point at which the electronic unit transmits the control to resume braking, at which moment, the electrovalve being returned to its initial position, the accumulator 30 will be in a position to assist in providing a rapid increase of pressure as the air in the accumulator 30 is shared throughout the system. This is indicated by the rapid rise of pressure in the brake actuator, as indicated by the line CD, and a rapid fall in the pressure in the accumulator 30, as indicated by the line FD. Subsequently the pressure in both rises in a manner determined by the characteristics of the valve unit 18. The rate and amount of the pressure rise CD in the brake actuator 24 will depend on the capacity of the accumulator 30. The optimum value of this can readily be determined on the basis of experimental results. It has been found that if the capacity of the accumulator 30 is half that of the actuator 24, short braking distances and good road-holding are obtained regardless of type of surface. In this case the jump in pressure CD is one third of the total decrease AC and, since the decrease BC is one half of the decrease AB, the jump CD is one half the decrease AB (although not shown to scale in FIG. 2). Clearly, however, the capacity of the accumulator can vary within wide limits, according to the type, weight and the initial trim of the vehicle on which the system is to be used.

We claim:

1. In a pneumatic anti-skid braking system for at least one wheel of a vehicle, of the type comprising:
    a pressure source of compressed air, brake actuator for said at least one wheel of said vehicle,
    means interconnecting said pressure source and said brake actuator, said interconnecting mean including braking control valve means operated by brake operating means to apply braking pressure from said pressure source to said brake actuator,
    anti-skid control means sensitive to the dynamic state of said at least one vehicle wheel and operating to produce an output control signal when said at least one vehicle wheel is in an incipient skidding state,
    first valve means in said interconnecting means and connected to said anti-skid control means, said first valve means operating to cause a controlled release of braking pressure when a control signal is received from the output of said anti-skid control means,
    second valve means in said interconnecting means, said second valve means operating to control the rise in braking pressure after the output signal from said anti-skid control means is removed,
    the improvement wherein there are provided: accumulator means in parallel with said first valve means two unidirectional valves one on each side of said accumulator means, said unidirectional valves being oriented such that said accumulator charges up to the braking pressure in said actuator during normal braking, retains said pressure upon release of said brake actuator in anti-skid operation of said first valve means under the control of said output signal from said anti-skid control means, and discharges said pressure to the braking circuit upon removal of the anti-skid control signal to share said pressure with said brake actuator.

2. The anti-skid brake system of claim 1, wherein the volume of said accumulator is half the volume of said brake actuator.

* * * * *